(12) United States Patent
Wu

(10) Patent No.: US 11,209,804 B2
(45) Date of Patent: Dec. 28, 2021

(54) INTELLIGENT PROCESSING TOOLS

(71) Applicant: Applied Materials, Inc., Santa Clara, CA (US)

(72) Inventor: Banqiu Wu, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 452 days.

(21) Appl. No.: 14/538,779

(22) Filed: Nov. 11, 2014

(65) Prior Publication Data

US 2016/0132042 A1    May 12, 2016

(51) Int. Cl.
*G05B 19/418*    (2006.01)

(52) U.S. Cl.
CPC .......... *G05B 19/41875* (2013.01); *G05B 2219/32335* (2013.01); *Y02P 90/02* (2015.11); *Y02P 90/80* (2015.11)

(58) Field of Classification Search
CPC .............. G05B 19/41875; G05B 2219/32335
USPC ........................................................ 700/121
See application file for complete search history.

(56) References Cited

U.S. PATENT DOCUMENTS

| | | | |
|---|---|---|---|
| 5,477,444 A * | 12/1995 | Bhat ...................... | B01D 3/425 700/48 |
| 6,565,759 B1 * | 5/2003 | Chen ................. | H01L 21/02129 216/16 |
| 7,169,625 B2 | 1/2007 | Davis et al. | |
| 7,624,003 B2 | 11/2009 | Yamartino | |
| 7,695,987 B2 | 4/2010 | Davis et al. | |
| 8,055,358 B2 * | 11/2011 | Blevins ................ | G05B 13/022 700/28 |
| 8,473,247 B2 | 6/2013 | Cruse et al. | |
| 2003/0049376 A1 * | 3/2003 | Schwarm ................ | C23C 16/52 427/255.28 |
| 2003/0062339 A1 * | 4/2003 | Houge ............... | H01J 37/32935 216/84 |
| 2003/0083757 A1 * | 5/2003 | Card ..................... | G05B 13/027 700/28 |
| 2003/0158709 A1 * | 8/2003 | Ishida ................ | G05B 13/0285 702/189 |
| 2005/0098535 A1 * | 5/2005 | Lansford ........... | H01L 21/67253 216/59 |
| 2006/0218107 A1 * | 9/2006 | Young ................... | G05B 13/027 706/13 |
| 2011/0295554 A1 * | 12/2011 | Baek ...................... | G05B 17/02 702/179 |

(Continued)

OTHER PUBLICATIONS

John V. Ringwood, "Estimation and Control in Semiconductor Etch: Practice and Possibilities", IEEE Transaction on Semiconductor Manufacturing, vol. 23, No. 1, Feb. 2010, pp. 87-98.

(Continued)

*Primary Examiner* — Kenneth M Lo
*Assistant Examiner* — Michael W Choi
(74) *Attorney, Agent, or Firm* — Schwabe, Williamson & Wyatt, P.C.

(57) ABSTRACT

One or more first parameters associated with an electronic device manufacturing process are monitored. An artificial neural network associated with the one or more first parameters is determined. One or more second parameters are determined using the artificial neural network. The one or more first parameters are adjusted using the one or more second parameters.

14 Claims, 10 Drawing Sheets

(56) References Cited

U.S. PATENT DOCUMENTS

2013/0119016 A1* 5/2013 Kagoshima ....... H01J 37/32935
216/59
2014/0031969 A1* 1/2014 Baseman ............. G05B 13/048
700/121

OTHER PUBLICATIONS

B. Wu, "Quartz etch optimization", Proc. SPIE 5446, 94 (2004).
W.S. McCulloch and W. Pitts, "A Logical Calculus of the Ideas Imminent in Nervous Activity", Bulletin of Mathematical Biophysics 5, 115 (1943).
F. Rosenblatt, "The Perceptron—a perceiving and recognizing automaton", Cornell Aeronautical Laboratory Report 85-460-1, Cornell University (1957).
B. Widrow and M.E. Hoff, "Adaptive switching circuits", WESCON Convention record: at the Western Electronic Show and Convention, part IV, pp. 96-104, Institute of Radio Engineers (IRE), Los Angeles, California, Aug. 23-26, 1960.
P.J. Werbos, "Beyond Regression: New Tools for Prediction and Analysis in the Behavioral Sciences", PhD dissertation, Harvard University (1974).
P.J. Werbos, "Backpropagation through time: what it does and how to do it", Proceedings of the IEEE 78, 1550 (1990).
J.P. Card, D.L. Sniderman, and C. Klimasauskas, "Dynamic neural control for a plasma etch process", Transactions on Neural Networks 8, 883-900, IEEE (1997).
F. Nadi, A.M. Agogino, and D.A. Hodges, "Use of influence diagrams and neural networks in modeling semiconductor manufacturing processes", Transactions on Semiconductor Manufacturing 4, 52-58, IEEE (1991).
W.S. McCulloch and W. Pitts, "A Logical Calculus of the Ideas Imminent in Nervous Activity", Bulletin of Mathematical Biophysics, vol. 5, 1943, pp. 115-133.

* cited by examiner

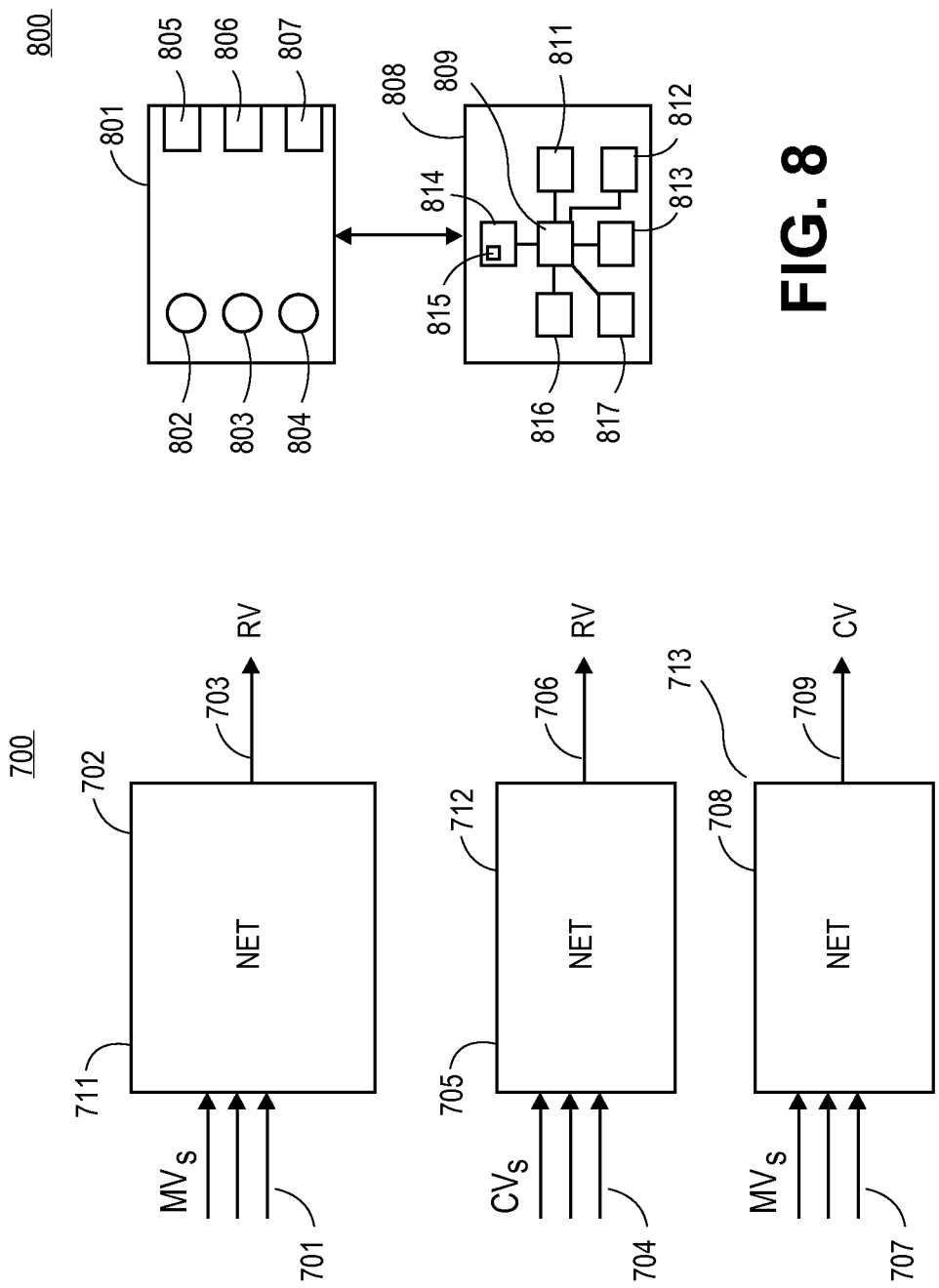

INTELLIGENT PROCESSING TOOLS

FIELD

Embodiments of the present invention pertain to the field of electronic device manufacturing, and in particular, to intelligent electronic device processing.

BACKGROUND

Generally, scaling of electronic devices involves using advanced semiconductor processing tools. Specifications on such semiconductor processing tools become more and more strict. To ensure the electronic device fabrication quality and meet the specifications, periodical preventive maintenances (PM) of the semiconductor processing tools are performed. Typically, the PM of the semiconductor processing tool refers to inspection, detection, and correction of the incipient failures before they occur or before they develop into major defects. Typically, PM involves performing tests, measurements, adjustments, and parts replacement to prevent failures from occurring. Typically, PM activities are performed at specified periods of time.

Between the PMs, the performance of the processing tool gradually worsens leading to decrease in quality of the devices being fabricated. The performance of the processing tool may become so low that the quality of the electronic device being manufactured becomes unacceptable.

Typically, after PM it takes a significant amount of time to recover the processing tool back to a normal condition that causes reduction of yield and throughput. In addition, processing tools with same functionality may have different performance. The difference in performance of the processing tools may result in a difference in performance of manufactured electronic devices that decreases production yield and throughput.

SUMMARY

Methods and apparatuses to provide intelligent processing tools are described. One or more first parameters associated with an electronic device manufacturing process are monitored. One or more second parameters are adjusted using an artificial neural network, wherein the one or more first parameters are adjusted using the one or more second parameters.

In one embodiment, one or more first parameters associated with an electronic device manufacturing process are monitored. A determination is made if the one or more first parameters are away from a target. If the one or more first parameters are away from the target, an artificial neural network associated with the one or more first parameters is determined. One or more second parameters are determined using the artificial neural network. The one or more first parameters are adjusted back to the target using the one or more second parameters.

In one embodiment, one or more target response variables are determined as output variables. A plurality of manipulated variables are determined as input variables based on the one or more target response variables. A plurality of functions of the one or more target response variables with respect to the plurality of the manipulated variables are calculated to determine an artificial neural network. One or more first parameters associated with an electronic device manufacturing process are monitored. One or more second parameters are determined using the artificial neural network. The one or more first parameters are adjusted using the one or more second parameters.

In one embodiment, one or more target response variables as output variables are determined. A plurality of controlled variables are determined as input variables based on the one or more target response variables. A plurality of functions of the one or more target response variables with respect to the plurality of the controlled variables are calculated to determine an artificial neural network. One or more first parameters associated with an electronic device manufacturing process are monitored. One or more second parameters are determined using the artificial neural network. The one or more first parameters are adjusted using the one or more second parameters.

In one embodiment, one or more target controlled variables are determined as one or more output variables. A plurality of manipulated variables are determined as input variables based on the one or more target controlled variables. A plurality of functions of the one or more target controlled variables with respect to the plurality of the manipulated variables are calculated to determine an artificial neural network. One or more first parameters associated with an electronic device manufacturing process are monitored. One or more second parameters are determined using the artificial neural network. The one or more first parameters are adjusted using the one or more second parameters.

In one embodiment, one or more first parameters associated with an electronic device manufacturing process are monitored. An artificial neural network associated with the one or more first parameters is determined. One or more second parameters are determined using the artificial neural network. The one or more first parameters are adjusted using the one or more second parameters. At least one of the second parameters is one of a manipulated variable and a controlled variable.

In one embodiment, one or more first parameters associated with an electronic device manufacturing process are monitored. An artificial neural network associated with the one or more first parameters is determined. One or more second parameters are determined using the artificial neural network. The one or more first parameters are adjusted using the one or more second parameters. At least one of the first parameters is one of a response variable and a controlled variable.

In one embodiment, a non-transitory machine readable medium comprises instructions that cause a data processing system to perform operations comprising monitoring one or more first parameters associated with an electronic device manufacturing process; adjusting one or more second parameters using an artificial neural network, wherein the one or more first parameters are adjusted using the one or more second parameters.

In one embodiment, a non-transitory machine readable medium comprises instructions that cause a data processing system to perform operations comprising monitoring one or more first parameters associated with an electronic device manufacturing process; determining if the one or more first parameters are away from a target. If the one or more first parameters are away from the target, determining an artificial neural network associated with the first parameters. One or more second parameters are determined using the artificial neural network. The one or more first parameters are adjusted back to the target using the one or more second parameters.

In one embodiment, a non-transitory machine readable medium comprises instructions that cause a data processing system to perform operations comprising determining one or more target response variables as output variables, determining a plurality of manipulated variables as input variables based on the one or more target response variables; and calculating a plurality of functions of the one or more target response variables with respect to the plurality of the manipulated variables to determine an artificial neural network. The non-transitory machine readable medium further comprises instructions that cause the data processing system to perform operations comprising monitoring one or more first parameters associated with an electronic device manufacturing process, determining one or more second parameters using the artificial neural network; and adjusting the one or more first parameters using the one or more second parameters.

In one embodiment, a non-transitory machine readable medium comprises instructions that cause a data processing system to perform operations comprising determining one or more target response variables as output variables, determining a plurality of controlled variables as input variables based on the one or more target response variables, and calculating a plurality of functions of the one or more target response variables with respect to the plurality of the controlled variables to determine the artificial neural network. The non-transitory machine readable medium further comprises instructions that cause the data processing system to perform operations comprising monitoring one or more first parameters associated with an electronic device manufacturing process, determining one or more second parameters using the artificial neural network; and adjusting the one or more first parameters using the one or more second parameters.

In one embodiment, a non-transitory machine readable medium comprises instructions that cause a data processing system to perform operations comprising determining one or more target controlled variables as one or more output variables, determining a plurality of manipulated variables as input variables based on the one or more controlled variables, and calculating a plurality of functions of the one or more target controlled variables with respect to the plurality of the manipulated variables to determine the artificial neural network. The non-transitory machine readable medium further comprises instructions that cause the data processing system to perform operations comprising monitoring one or more first parameters associated with an electronic device manufacturing process, determining one or more second parameters using the artificial neural network; and adjusting the one or more first parameters using the one or more second parameters.

In one embodiment, a non-transitory machine readable medium comprises instructions that cause a data processing system to perform operations comprising monitoring one or more first parameters associated with an electronic device manufacturing process; determining an artificial neural network associated with the first parameters; determining one or more second parameters using the artificial neural network; and adjusting the one or more first parameters using the one or more second parameters. At least one of the second parameters is one of a manipulated variable and a controlled variable.

In one embodiment, a non-transitory machine readable medium comprises instructions that cause a data processing system to perform operations comprising monitoring one or more first parameters associated with an electronic device manufacturing process; determining an artificial neural network associated with the first parameters; determining one or more second parameters using the artificial neural network; and adjusting the one or more first parameters using the one or more second parameters. At least one of the first parameters is one of a response variable and a controlled variable.

In one embodiment, a system to manufacture an electronic device, comprises a processing chamber. A processor is coupled to the processing chamber. A memory is coupled to the processor. The processor has a configuration to control monitoring one or more first parameters associated with an electronic device manufacturing process. The processor has a configuration to control adjusting one or more second parameters using an artificial neural network, wherein the one or more first parameters are adjusted using the one or more second parameters.

In one embodiment, a system to manufacture an electronic device, comprises a processing chamber. A processor is coupled to the processing chamber. A memory is coupled to the processor. The processor has a configuration to control monitoring one or more first parameters associated with an electronic device manufacturing process. The processor has a configuration to control determining if the one or more first parameters are away from a target. The processor has a configuration to determine an artificial neural network associated with the one or more first parameters, if the one or more first parameters are away from the target. The processor has a configuration to control determining one or more second parameters using the artificial neural network. The processor has a configuration to control adjusting the one or more first parameters back to the target using the one or more second parameters.

In one embodiment, a system to manufacture an electronic device, comprises a processing chamber. A processor is coupled to the processing chamber. A memory is coupled to the processor. The processor has a configuration to control determining one or more target response variables as output variables. The processor has a configuration to control determining a plurality of manipulated variables as input variables based on the one or more target response variables. The processor has a configuration to control calculating a plurality of functions of the one or more target response variables with respect to the plurality of the manipulated variables to determine an artificial neural network. The processor has a configuration to control monitoring one or more first parameters associated with an electronic device manufacturing process. The processor has a configuration to control determining one or more second parameters using the artificial neural network. The processor has a configuration to control adjusting the one or more first parameters using the one or more second parameters.

In one embodiment, a system to manufacture an electronic device, comprises a processing chamber. A processor is coupled to the processing chamber. A memory is coupled to the processor. The processor has a configuration to control determining one or more target response variables as output variables. The processor has a configuration to control determining a plurality of controlled variables as input variables based on the one or more target response variables. The processor has a configuration to control calculating a plurality of functions of the one or more target response variables with respect to the plurality of the controlled variables to determine an artificial neural network. The processor has a configuration to control monitoring one or more first parameters associated with an electronic device manufacturing process. The processor has a configuration to control determining one or more second parameters using the artificial neural network. The processor has a configuration to control adjusting the one or more first parameters using the one or more second parameters.

In one embodiment, a system to manufacture an electronic device, comprises a processing chamber. A processor is coupled to the processing chamber. A memory is coupled to the processor. The processor has a configuration to control determining one or more target controlled variables as output variables. The processor has a configuration to control determining a plurality of manipulated variables as input variables based on the one or more target controlled variables. The processor has configuration to control calculating a plurality of functions of the one or more target controlled variables with respect to the plurality of the manipulated variables to determine an artificial neural network. The processor has a configuration to control monitoring one or more first parameters associated with an electronic device manufacturing process. The processor has a configuration to control determining one or more second parameters using the artificial neural network. The processor has a configuration to control adjusting the one or more first parameters using the one or more second parameters.

In one embodiment, a system to manufacture an electronic device comprises a processing chamber. A processor is coupled to the processing chamber. A memory is coupled to the processor. The processor has a configuration to control monitoring one or more first parameters associated with an electronic device manufacturing process. The processor has a configuration to control determining an artificial neural network associated with the one or more first parameters. The processor has a configuration to control determining one or more second parameters using the artificial neural network. The processor has a configuration to control adjusting the one or more first parameters using the one or more second parameters.

At least one of the first parameters is a response variable. At least one of the second parameters is one of a manipulated variable and a controlled variable.

In one embodiment, a system to manufacture an electronic device, comprises a processing chamber. A processor is coupled to the processing chamber. A memory is coupled to the processor. The processor has a configuration to control monitoring one or more first parameters associated with an electronic device manufacturing process. The processor has a configuration to control determining an artificial neural network associated with the one or more first parameters. The processor has a configuration to control determining one or more second parameters using the artificial neural network. The processor has a configuration to control adjusting the one or more first parameters using the one or more second parameters. At least one of the first parameters is a controlled variable. At least one of the second parameters is a manipulated variable.

Other features of the embodiments of the present invention will be apparent from the accompanying drawings and from the detailed description which follows.

BRIEF DESCRIPTION OF THE DRAWINGS

The embodiments as described herein are illustrated by way of example and not limitation in the figures of the accompanying drawings in which like references indicate similar elements.

FIG. 7 is a view showing block diagrams illustrating ANNs generated using methods described with respect to FIGS. 5, 6 and 7.

FIG. 8 shows a block diagram of an intelligent processing system using an ANN according to one embodiment.

DETAILED DESCRIPTION

Figure 1:
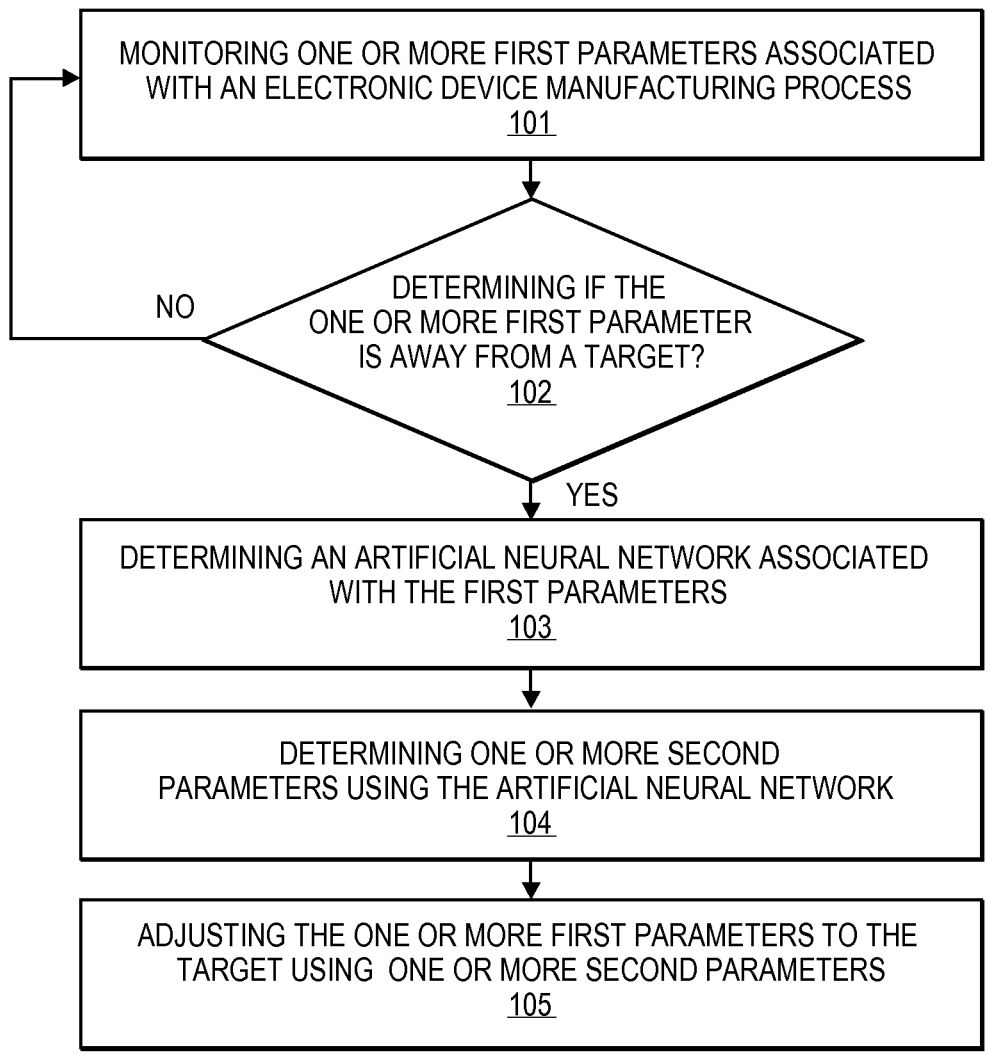
FIG. 1 is a flowchart of a method to provide an intelligent processing tool according to one embodiment of the invention.

In the following description, numerous specific details, such as specific materials, chemistries, dimensions of the elements, etc. are set forth in order to provide thorough understanding of one or more of the embodiments of the present invention. It will be apparent, however, to one of ordinary skill in the art that the one or more embodiments of the present invention may be practiced without these specific details. In other instances, semiconductor fabrication processes, techniques, materials, equipment, etc., have not been described in great details to avoid unnecessarily obscuring of this description. Those of ordinary skill in the art, with the included description, will be able to implement appropriate functionality without undue experimentation.

While certain exemplary embodiments of the invention are described and shown in the accompanying drawings, it is to be understood that such embodiments are merely illustrative and not restrictive of the current invention, and that this invention is not restricted to the specific constructions and arrangements shown and described because modifications may occur to those ordinarily skilled in the art.

Reference throughout the specification to "one embodiment", "another embodiment", or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all the features of a single disclosed embodiment. Thus, the claims following the Detailed Description are hereby expressly incorporated into this Detailed Description, with each claim standing on its own as a separate embodiment of this invention. While the invention has been described in terms of several embodiments, those skilled in the art will recognize that the invention is not limited to the embodiments described, but can be practiced with modification and alteration within the spirit and scope of the appended claims. The description is thus to be regarded as illustrative rather than limiting.

Methods and apparatuses to provide intelligent processing tools are described. One or more first parameters associated with an electronic device manufacturing process are monitored. An artificial neural network associated with the one or more first parameters is determined. One or more second parameters are adjusted using an artificial neural network, wherein the one or more first parameters are adjusted using the one or more second parameters.

Generally, scaling of electronic devices causes tighter controls on PM recovery and chamber matching. Currently, almost every processing operation to manufacture an electronic device is approaching a technology limit. In one embodiment, a semiconductor processing tool learns from R&D and production data and dynamically adjusts processing parameters using artificial neural network (ANN) to ensure a substantially constant processing performance over time, to ensure a substantially identical processing performance for tools matching, or both. In an embodiment, an intelligent semiconductor processing tool comprises a processing chamber and a processor coupled to the processing chamber that learns from R&D and production data using an ANN stored in a memory, and adjusts manipulated variables (knobs) based on learning. Comparing with existing tools, the processing tool comprising an ANN provides an advantage in that the performance of the processing tool is automatically maintained without a need for frequent PMs. Advantageously, the process window within which the performance of the processing tool is automatically adjusted using the ANN is substantially reduced comparing with existing techniques. Incorporating the ANN into the processing tool advantageously improves the electronic device processing, increases manufacturing yield and throughput.

FIG. 1 is a flowchart of a method 100 to provide an intelligent processing tool according to one embodiment of the invention. At operation 101 one or more first parameters associated with an electronic device manufacturing process are monitored. In alternative embodiments, the electronic device manufacturing process is a plasma etch process, a photomask processing, an ion implantation process, a plasma deposition process, or any other electronic device manufacturing process. In alternative embodiments, the intelligent processing tool is a plasma etch tool, a plasma deposition tool, an ion implantation tool, a photomask processing tool, or any other electronic device manufacturing tool. In one embodiment, the one or more first parameters comprise tool performance parameters. In one embodiment, the tool performance parameters are process response variables (RVs). Generally, a response variable refers to a dependent variable that can change as the result of an independent variable's change. In one embodiment, process response variables (RVs) comprise a process rate, a process critical dimension, a process critical dimension bias, a process selectivity, a process uniformity, other process response variables, or any combination thereof. For example, a plasma etch process has one or more RVs—e.g., an etch rate, an etch critical dimension bias, an etch selectivity, and optical emission spectroscopy (OEM) data.

In another embodiment, the tool performance parameters are controlled variables (CVs). Generally, a controlled variable refers to a variable that is controlled or held constant during a process. In one embodiment, process CVs comprise a bias voltage, a source power, a plasma density, an automatic matching network data, other controlled variables, or any combination thereof. For example, a plasma etch process has one or more controlled variables, such as a DC bias voltage, a peak-to-peak voltage, a reflected power, a shunt conductor of the source power, a series conductor of the source power, a plasma density, a radical density, an electron density, an automatic matching network data, other controlled variables, or any combination thereof. In an embodiment, the one or more first parameters are monitored using one or more sensors. In another embodiment, the one or more first parameters are measured. At operation 102 a determination is made if the one or more first parameters are away from a target. The target can be—e.g., a predetermined value, a predetermined range, a predetermined percentage, a predetermined rate, or any other predetermined target.

Figure 2:
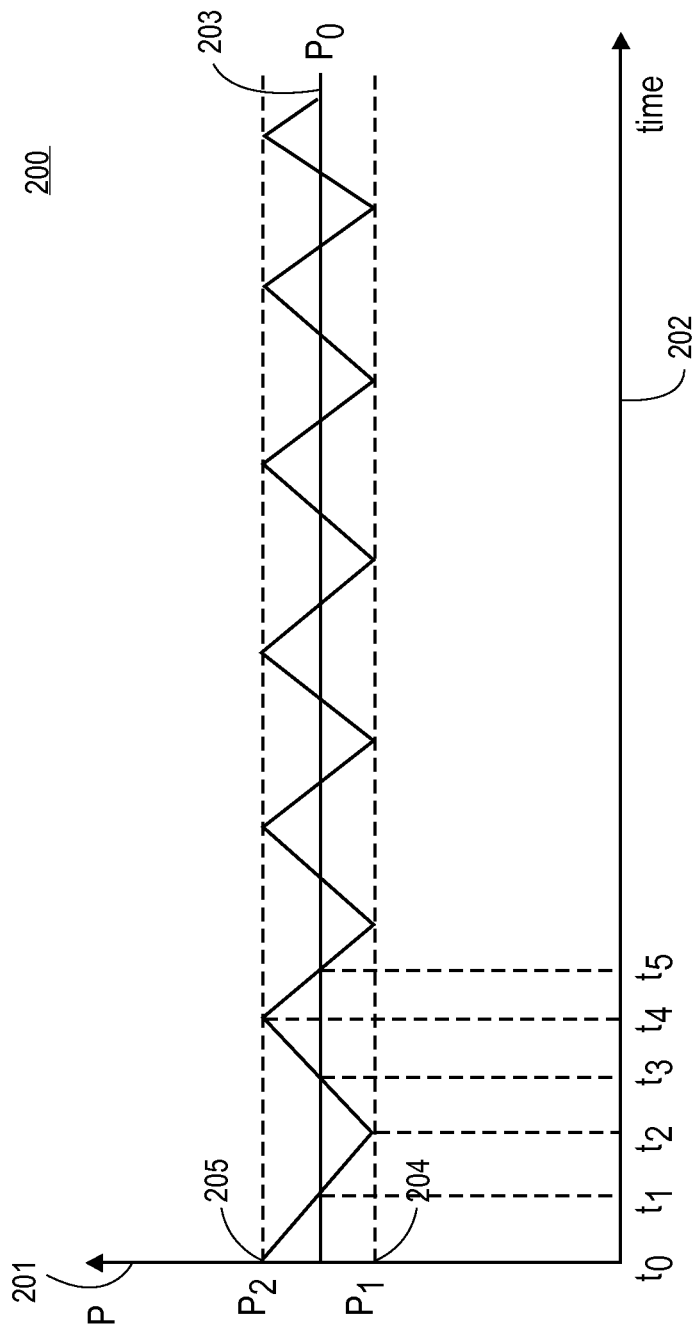
FIG. 2 is an exemplary graph showing a process performance parameter P versus a time according to one embodiment of the invention.

FIG. 2 is an exemplary graph 200 showing a process performance parameter P 201 versus a time 202 according to one embodiment of the invention. As shown in FIG. 2, a process performance parameter P is maintained close to a target 203 (P0) within an upper limit 205 (P2) and a lower limit 204 (P1). In one embodiment, the performance parameter P is compared with a target P0. In one embodiment, it is determined if a difference between the performance parameter P and the target P0 is greater than an upper limit P2. In another embodiment, it is determined if a difference between the performance parameter P and the target P0 is greater than a lower limit P1. In an embodiment, the difference between the target P0 and each of the lower limit P1 and upper limit P2 is in an approximate range from about 0.1% to about 5%. In another embodiment, the difference between the target P0 and each of the lower limit P1 and upper limit P2 is less than about 3%.

Referring back to FIG. 1, if the one or more first parameters is away from a target, an ANN associated with the first parameters is determined at operation 103. If the one or more first parameters are not away from the target, method 100 returns back to operation 101. In an embodiment, if the difference between the performance parameter P and the target P0 matches at least one of the lower limit P1 and the upper limit P2, the ANN associated with the one or more first parameters is determined. In one embodiment, the ANN associated with the one or more first parameters is generated using training and learning processes, as described in further detail below. In one embodiment, the ANN associated with the one or more first parameters is selected from a plurality of artificial neural networks stored in a memory, as described in further detail below. In one embodiment, each of the one or more first parameters determined to be away from the target is used as an output for the ANN.

Referring to FIG. 2, from time t0 to t1, the performance parameter P is monitored. At time t1, when the performance parameter P approaches lower limit P1, the ANN associated with the performance parameter P is determined. In one embodiment, the ANN associated with the performance parameter P is selected from a plurality of ANNs stored in a memory.

Referring back to FIG. 1, at operation 104 one or more second parameters are determined using the ANN. In one embodiment, the one or more second parameters comprise manipulated variables. Generally, a manipulated variable (MV) refers to an independent variable that is manipulated to achieve a certain effect of a process. In one embodiment, the MVs comprise a source power, a bias power, a pressure, a gas flow rate, a gas composition, a temperature, an electromagnet power, other manipulated variables, or any combination thereof. For example, a plasma etch process has one or more MVs, such as a source power, a bias power, a pressure and a gas flow rate. In another embodiment, the one or more second parameters comprise controlled variables (CV), as described above. In one embodiment, the ANN establishes input-output function nets between RVs and MVs, between CVs and MVs, or both. By training and learning processes of one or more ANNs, the one or more second parameters are adjusted according to the nets to maintain the performance parameters in a predetermined range, as described in further detail below. In one embodiment, the one or more second parameters are adjusted using the ANN to bring the one or more first performance parameters back to the target. In one embodiment, the one or more second parameters to bring the first parameters back to the target are identified using the ANN. In an embodiment, an amount of adjustment for each of the identified one or more second parameter is calculated using the ANN.

At operation 105 one or more first parameters are adjusted using at least one of the second parameters. Referring back to FIG. 2, at time t3, the performance parameter P is adjusted back to the target P0 by adjusting one or more second parameters using the ANN. In one embodiment, one or more MVs are adjusted according to ANN nets to maintain the process performance parameters within a predetermined range (e.g., within the upper limit P2 and lower limit P1). At time t4, when it is determined that the performance parameter approaches to the upper limit P2, the one or more second parameters are adjusted using the ANN to bring the performance parameter P back to the target P0 at time t5. In one embodiment, between the PMs, the one or more MVs are adjusted automatically using the ANN to maintain the performance of the processing tool within a predetermined range. In another embodiment, for different processing chambers, the one or more MVs are adjusted automatically using the ANN to maintain the identical performance. As shown in FIG. 2, using the ANN the performance of the processing tool is automatically maintained a substantially constant level.

Figure 3:
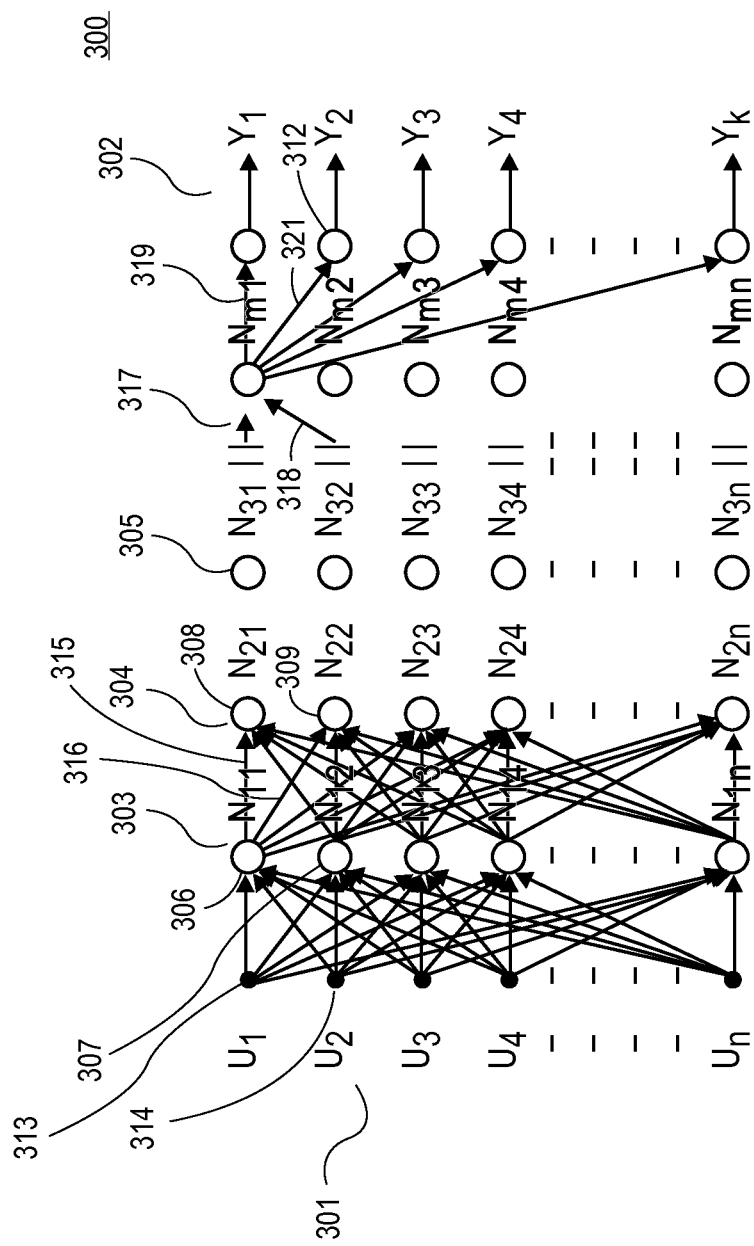
FIG. 3 is a view illustrating a schematic of an ANN associated with parameters of the electronic device manufacturing process according to one embodiment of the invention.

FIG. 3 is a view illustrating a schematic of an ANN associated with parameters of the electronic device manufacturing process according to one embodiment of the invention. ANN 300 comprises an input variable layer 301, an output variable layer 302, and one or more hidden layers, such as hidden layers 303, 304 and 305. Input variable layer 301 comprises input variables $u_1, u_2, \ldots u_n$,—e.g., an input variable $u_1$ 313 and an input variable $u_2$ 314—where n can be any integer greater than zero. For example, for a plasma etch process, ANN comprises n input variables $u_1, u_2, \ldots u_n$, where n is 12, or any other integer greater than zero. Output variable layer 302 comprises output variables $y_1, y_2, \ldots y_k$,—e.g., an output variable $u_1$ 312—where k can be any integer greater than zero. The hidden layers comprise a plurality of neurons $N_{11}, N_{12}, \ldots N_{nm}$. As shown in FIG. 3, hidden layer 303 comprises n neurons $N_{11}, N_{12}, \ldots N_{1n}$—e.g., a neuron $N_{11}$ 306 and a neuron $N_{12}$ 307. Hidden layer 304 comprises n neurons $N_{21}, N_{22}, \ldots N_{2n}$—e.g., a neuron $N_{21}$ 308 and a neuron $N_{22}$ 309. As shown in FIG. 3, the neurons $N_{11}, N_{12}, \ldots N_{nm}$ represent functions of the one or more output variables $y_1, y_2, \ldots y_k$ with respect to a plurality of the input variables $u_1, u_2, \ldots u_n$. As shown in FIG. 3, each neuron has a plurality of inputs and a plurality of outputs to a next layer. For example, neuron $N_{11}$ 306 has a plurality of inputs to input variables $u_1, u_2, \ldots u_n$, and a plurality outputs, such as an output 315 and an output 316 to a next hidden layer 304. A neuron $N_{m1}$ has a plurality of inputs, such as an input 317 and an input 318 to input variables from a previous hidden layer, such as a hidden layer comprising neurons $N_{(m-1)1} \ldots N_{(m-1)n}$. Neuron $N_{m1}$ has a plurality of outputs, such as an output 319 and an output 321 to output layer 302.

In one embodiment, a neuron represents a weighted sum of multiple input variables for generating an output, where the weight represents the effective magnitude of information transmission between neurons. The output layer represents an overall activity transmitted by the neurons in a processing stream.

In one embodiment, an output of the ANN is calculated as follows:

$$y = \text{Net}(u1, u2, \ldots un) \qquad (1)$$

In an embodiment, a function z of a neuron is calculated as follows:

$$z = f(u_i, w_i) = \zeta\left(\sum_i^n u_i w_i + \text{bias}\right) \qquad (2)$$

An output of the ANN is calculated as follows:

$$y = f(z) \qquad (3)$$

where $u_i$ (i=1 to n) is an input variable; $w_i$ (i=1 to n) is a weight. In one embodiment, the weight determines a slope of the function and the bias determines an offset of the function. In one embodiment, the bias represents a difference between an actual output and a desired output. In alternative embodiments, the function (3) can be a linear function, a non-linear function—e.g., a sigmoidal function, a step function, a ramp function, a Gaussian function, other non-linear function, or any combination thereof. In one embodiment, the output of the ANN is represented as a sigmoidal function as follows:

$$y = f(z, T, c) = \frac{1}{1 + e^{-c(z+T)}} \qquad (4)$$

where T and c are the measures of the shift of the function and the steepness, respectively. For a large value of c, the sigmoidal function approximates as a step function.

In one embodiment, each of the tool performance parameters $P_1 \ldots P_k$—e.g., the process response variables (RVs) acting as an output of the ANN is expressed as follows:

$$P1 = y_1 = f_1(u_1, u_2, \ldots u_n) \qquad (1)$$
$$P2 = y_2 = f_2(u_1, u_2, \ldots u_n)$$
$$\ldots$$
$$Pk = y_k = f_k(u_1, u_2, \ldots u_n)$$

In one embodiment, the ANN is determined through a least mean square (LMS) learning process. In alternative embodiments, other learning processes known to one of ordinary skill in the art of ANN networks are used for the ANN learning process. In one embodiment, the performance parameter is determined by calculating an output of the ANN for a given input.

In one embodiment, a difference between a desired or target output and an actual output is defined as an error. For a given set of the input variables $u_1, u_i, \ldots u_n$ and a given set of output variables $y_1, y_i \ldots y_k$, and a target or desired output variable Yi the learning involves adjusting the weights through a training set $\{(u_i, y_i)\}$ to minimize the error. After the learning process, an input-output function of the ANN associated with the parameters of the electronic device manufacturing process is determined. In an embodiment, an ANN is trained using a supervised learning. The measured performance parameters associated with an electronic device manufacturing process are used as one or more target outputs of the ANN. The calculated outputs obtained by using the ANN are compared with the target outputs.

If the calculated output of the ANN matches to the target or desired output within a predetermined range, the ANN is determined to be acceptable to approximate the performance parameters associated with the electronic device manufacturing process. After the ANN is determined, one or more second parameters of the electronic device manufacturing process can be adjusted to bring back one or more first parameters back to the target. In one embodiment, one or more manipulated variables are adjusted to cause an output of one or more response variables match with a target. In another embodiment, at a constant setting of the manipulated variables, one or more controlled variables are adjusted to cause an output of one or more response variables match with a target. In yet another embodiment, one or more manipulated variables are adjusted to cause one or more controlled variables drift to a target.

In one embodiment, the artificial network has a model program. In one embodiment, the model program is used to calculate functions of the response variables with respect to the manipulated variables. In another embodiment, the model program is used to calculate functions of the response variables with respect to the controlled variables. In yet another embodiment, the model program is used to calculate functions of the controlled variables with respect to manipulated variables.

Figure 4:
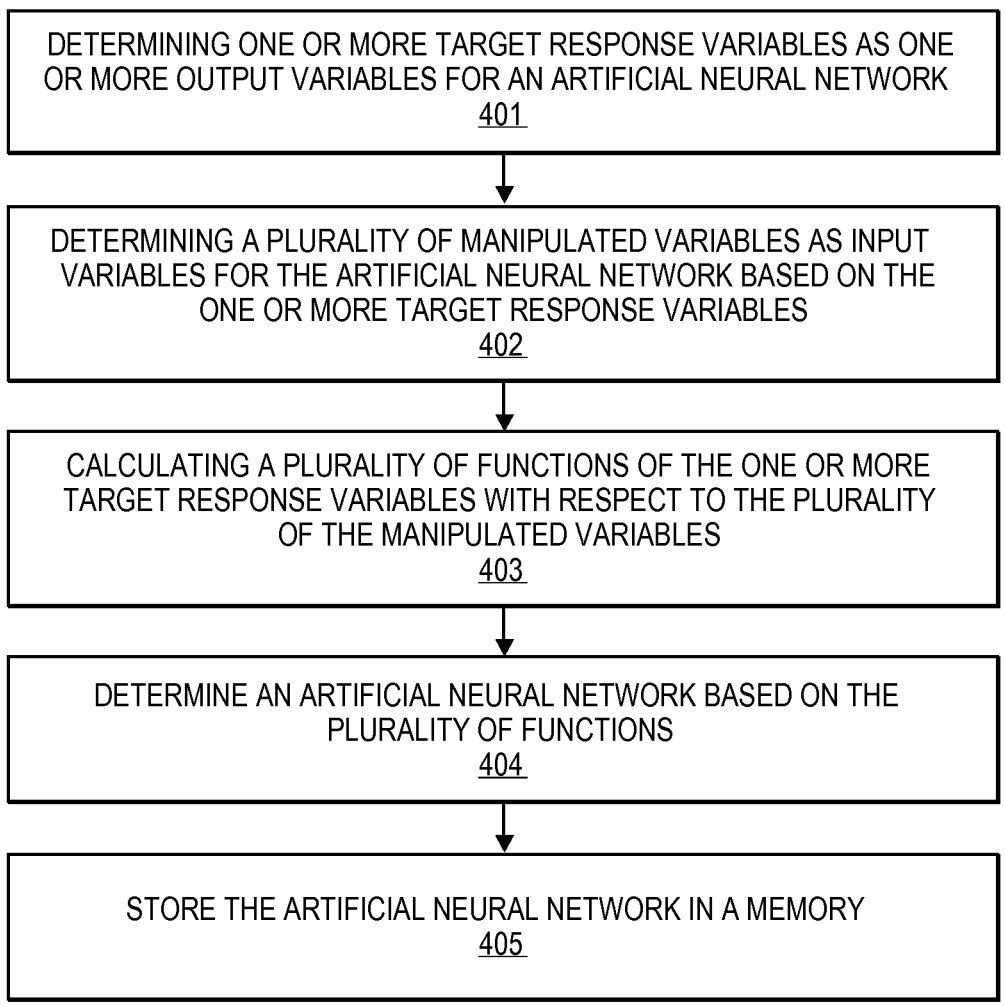
FIG. 4 is a flowchart of a method to provide an artificial neural network (ANN) according to one embodiment of the invention.

FIG. 4 is a flowchart of a method 400 to provide an artificial neural network (ANN) according to one embodiment of the invention. At operation 401 one or more target response variables (RVs) as one or more output variables for an ANN are determined. The target RVs are measured performance parameters associated with an electronic device manufacturing process, for example, a plasma etch process, or any other device manufacturing process. In an embodiment, one or more target RVs associated with the device manufacturing process are identified and measured. For example, the target RVs—e.g., a process rate, a process critical dimension, a process critical dimension bias, a process selectivity, a process uniformity, other one or more process response variables or any combination thereof,—are identified and measured. For a plasma etch process at least one of the target RVs—e.g., etch rate, etch CD bias, etch selectivity, etch CD uniformity, or any combination thereof—is identified and measured. For a plasma deposition process at least one of the target RVs—e.g., deposition rate, deposition uniformity, or any combination thereof—is identified and measured. For example, the etch CD bias is measured as being from about 1.0 nm to about 5.0, etch selectivity from about 0.5 nm to about 1.5 nm, and etch uniformity from about 1.0 nm to about 3.0 nm.

At operation 402 a plurality of manipulated variables (MVs) are determined as input variables for the ANN based on the one or more target RVs. In one embodiment, the MVs comprise a source power, a bias power, a pressure, a gas flow rate, a gas composition, a temperature, an electromagnet power, other manipulated variables, or any combination thereof, as described above. In one embodiment, the manipulated variables are identified using the one or more target RVs. In one embodiment, the manipulated variables are set based on the one or more target RVs. In one embodiment, for a plasma etch process, a plasma deposition process, or both, the MVs—e.g., a source power, a bias power, a pressure, a gas flow rate, a gas composition, a temperature, or any combination thereof are identified and set based on the at least one of the target RVs, for example based on the measured process CD bias. At operation 403 a plurality of functions of the one or more target RVs with respect to the plurality of the MVs are calculated, as described above with respect to FIG. 3. At operation 404 the artificial neural network is determined based on the plurality of functions using training and learning processes, as described above with respect to FIG. 3. At operation 405 the artificial neural network is stored in a memory.

Figure 5:
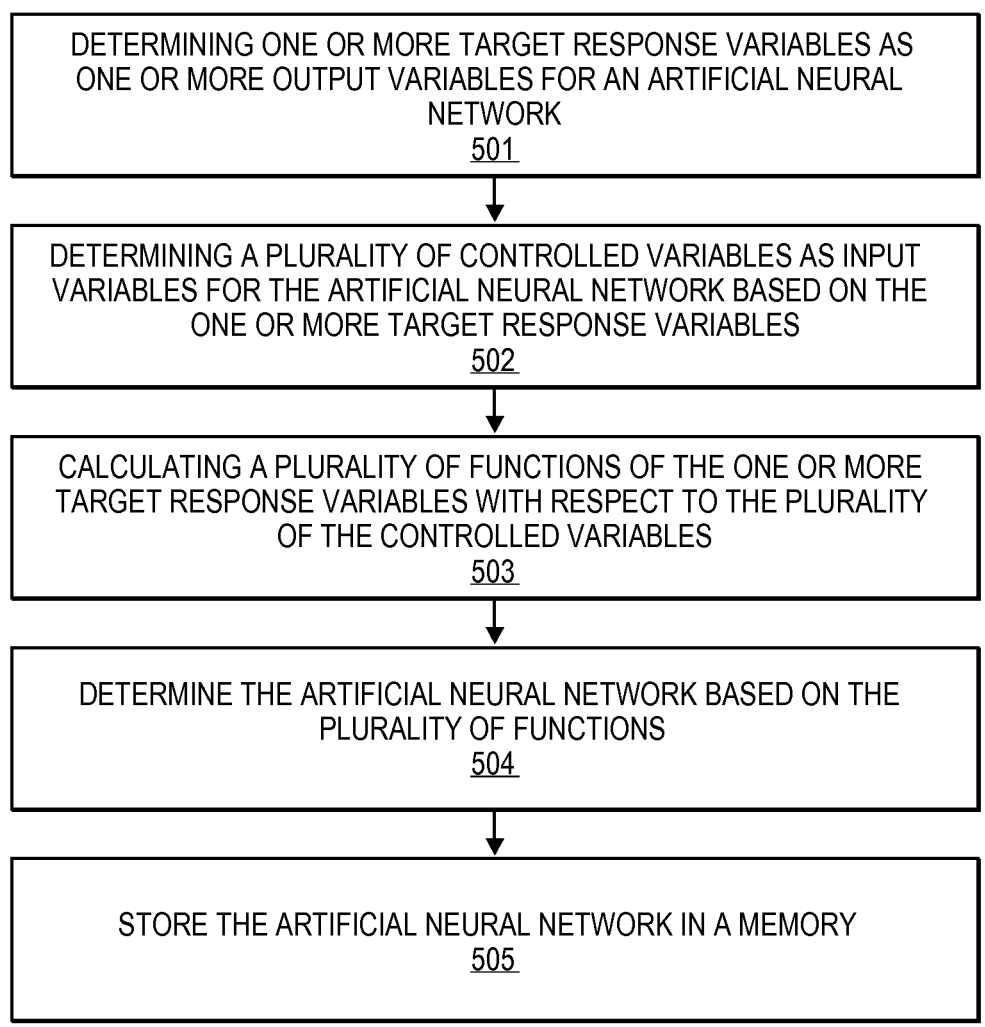
FIG. 5 is a flowchart of a method to provide an artificial neural network (ANN) according to another embodiment of the invention.

FIG. 5 is a flowchart of a method 500 to provide an artificial neural network (ANN) according to another embodiment of the invention. At operation 501 one or more target RVs as one or more output variables for an ANN are determined, as described above. At operation 502 a plurality of controlled variables (CVs) are determined as input variables for the ANN based on the one or more target RVs. In one embodiment, the CVs comprise a DC bias voltage, a peak-to-peak voltage, a reflected power, a shunt of the source power, a series of the source power, a plasma density, a radical density, an electron density, an automatic matching network data, one or more other controlled variables, or any combination thereof, as described above. In one embodiment, the CVs are identified using the one or more target RVs. In one embodiment, the CVs are set using the one or more target RVs. In one embodiment, for a plasma etch process, a plasma deposition process, or both the CVs—e.g., a DC bias voltage, a peak-to-peak voltage, a reflected power, a shunt of the source power, a series of the source power, a plasma density, a radical density, an automatic matching network data, or any combination thereof are identified and set based on the at least one of the target RVs, for example based on the measured process CD bias. At operation 503 a plurality of functions of the one or more target RVs with respect to the plurality of the CVs are calculated, as described above with respect to FIG. 3. At operation 504 the artificial neural network is determined based on the plurality of functions using training and learning processes, as described above with respect to FIG. 3. At operation 505 the artificial neural network is stored in a memory.

Figure 6:
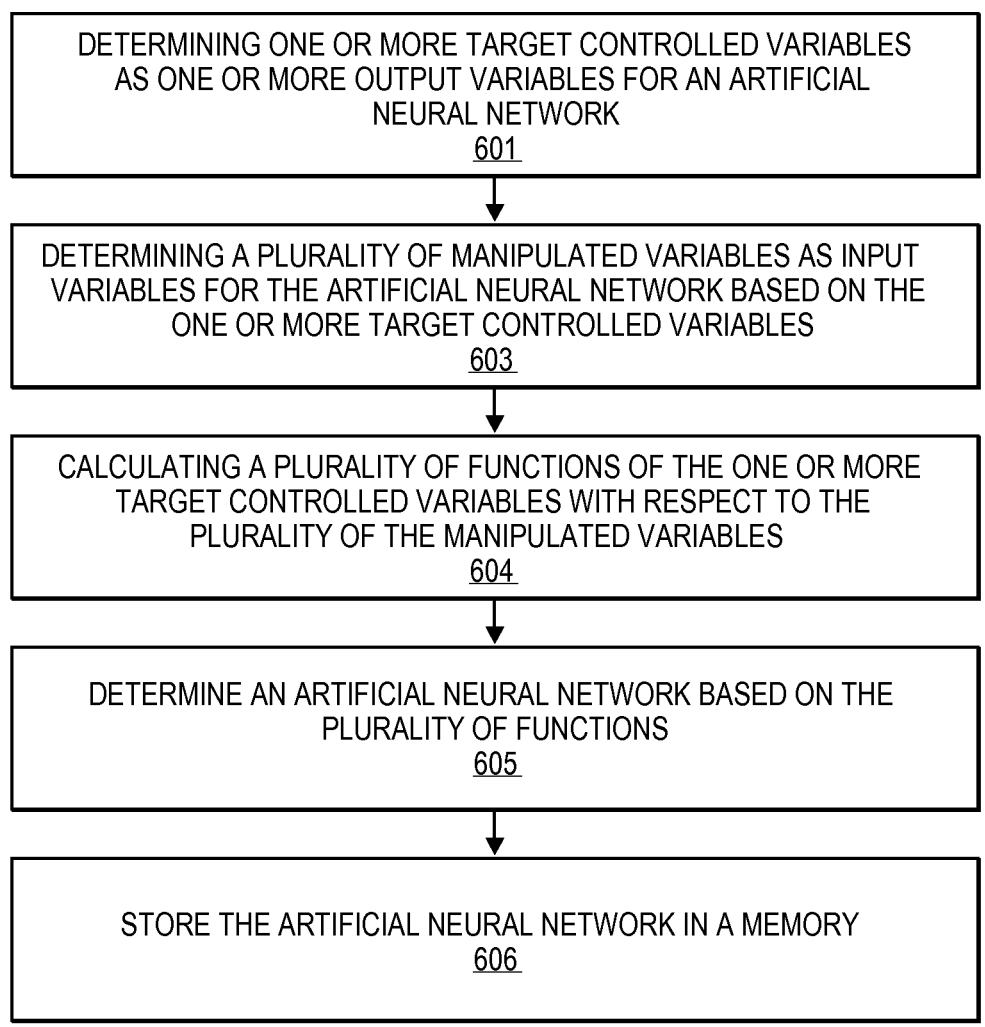
FIG. 6 is a flowchart of a method to provide an artificial neural network (ANN) according to another embodiment of the invention.

FIG. 6 is a flowchart of a method 600 to provide an artificial neural network (ANN) according to another embodiment of the invention. At operation 601 one or more target controlled variables (CVs) as one or more output variables for an ANN are determined. The target CVs are measured controlled variables associated with an electronic device manufacturing process, for example, a plasma etch process, or any other device manufacturing process. In an embodiment, one or more target CVs associated with the device manufacturing process are identified and measured. For example, the target CVs—e.g., a DC bias voltage, a peak-to-peak voltage, a reflected power, a shunt of the source power, a series of the source power, a plasma density, a radical density, an electron density, an automatic matching network data, one or more other controlled variables, or any combination thereof are identified and measured. For example, for a plasma etch process, a plasma deposition process, or both, at least one of the target CVs—e.g., a DC bias voltage, a peak-to-peak voltage, a reflected power, a shunt of the source power, a series of the source power, a plasma density, a radical density and an automatic matching network data—are identified and measured. For example, a DC bias voltage is in an approximate range of 100 volts to 300 volts, and a reflected power in an approximate range of 1.0 watts to 20 watts.

At operation 602 a plurality of manipulated variables are determined as input variables for the ANN based on the one or more target CVs. In one embodiment, the MVs comprise a source power, a bias power, a pressure, a gas flow rate, a gas composition, a temperature, an electromagnet power, other manipulated variables, or any combination thereof, as described above. In one embodiment, the manipulated variables are identified using the one or more target CVs. In one embodiment, the manipulated variables are set based on the one or more target CVs. In one embodiment, for a plasma etch process, a plasma deposition process, or both, the MVs—e.g., a source power, a bias power, a pressure, a gas flow rate, a gas composition, a temperature, or any combination thereof are identified and set based on the at least one of the target CVs, for example based on the measured DC bias voltage. At operation 603 a plurality of functions of the one or more target CVs with respect to the plurality of the MVs are calculated, as described above. At operation 604 the artificial neural network is determined based on the plurality of functions using training and learning processes, as described above with respect to FIG. 3. At operation 605 the artificial neural network is stored in a memory.

FIG. 7 is a view 700 showing block diagrams illustrating ANNs generated using methods described with respect to FIGS. 5, 6 and 7. A diagram 702 shows an ANN 711 comprising a plurality of functions of one or more target RVs 703 with respect to a plurality of MVs 701 generated using method 400 as described with respect to FIG. 4. A diagram 712 shows an ANN 705 comprising a plurality of functions of one or more target RVs 706 with respect to a plurality of CVs 704 generated using method 500 as described with respect to FIG. 5. A diagram 713 shows an ANN 708 comprising a plurality of functions of one or more target CVs 709 with respect to a plurality of MVs 707 generated using method 600 as described with respect to FIG. 6.

Figure 9:
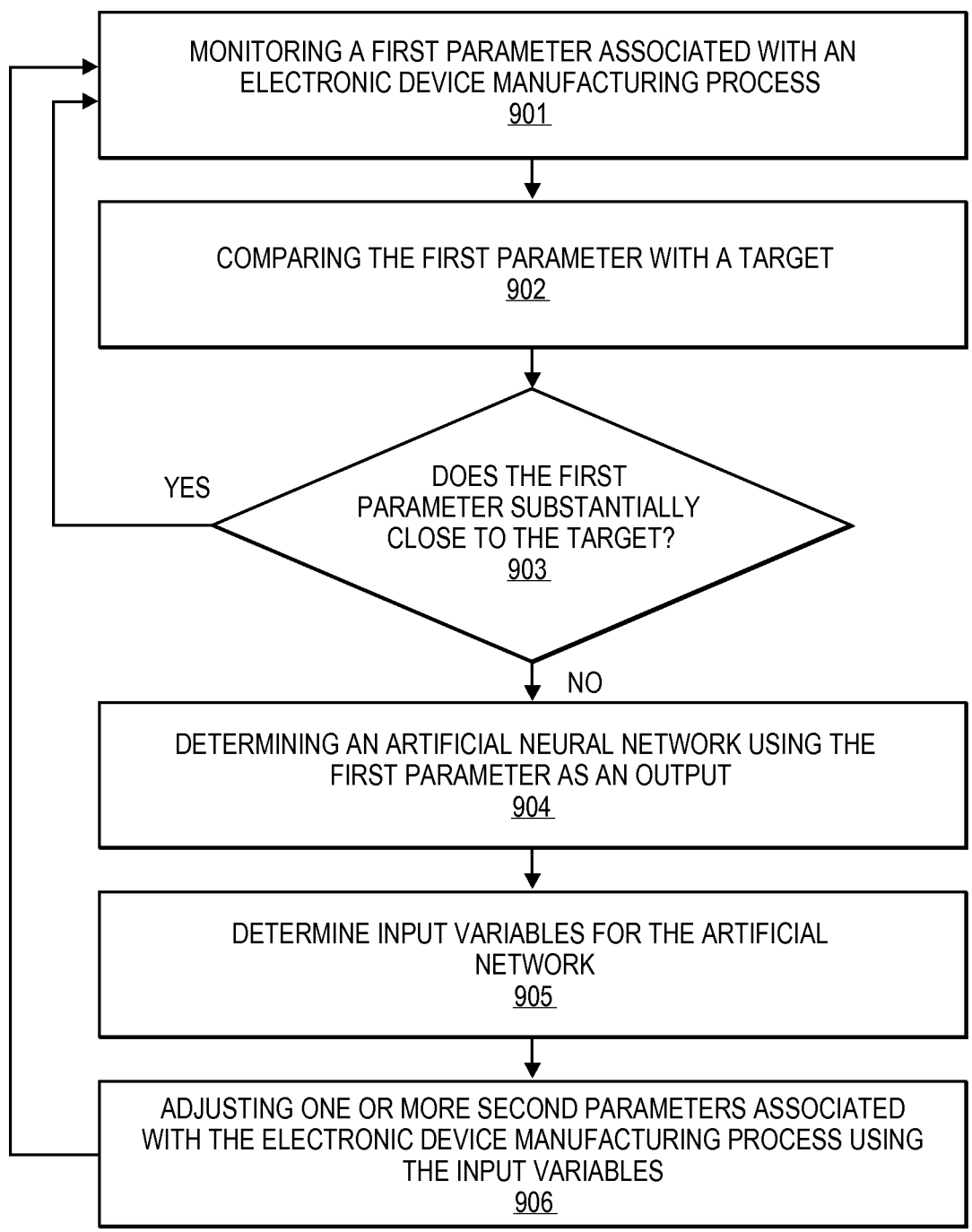
FIG. 9 is a flowchart of a method to provide an intelligent processing tool according to another embodiment of the invention.

FIG. 9 is a flowchart of a method 900 to provide an intelligent processing tool according to another embodiment of the invention. Method 900 starts with operation 901 involving monitoring a first parameter associated with an electronic device manufacturing process. The first parameter represents one of a response variable (RV) and a controlled variable (CV), as described above. At operation 902 the first parameter is compared with a target, as described above. At operation 903 it is determined if the first parameter is substantially close to the target, as described above. If the first parameter is substantially close to the target, method 900 returns to operation 901. If the first parameter is not substantially close to the target, at operation 904 an ANN is determined using the first parameter as an output. In one embodiment, the ANN is selected based on the first parameter from a plurality of ANNs generated using training and learning processes and stored in a memory, as described above. At operation 905 one or more input variables for the ANN are determined based on the first parameter. In one embodiment, one or more input variables represent one or more MVs, one or more CVs, or both, as described above. In one embodiment, the one or more input variables representing one or more MVs are identified for the selected ANN based on the first parameter representing an RV. In another embodiment, the one or more input variables representing one or more CVs are identified for the selected ANN based on the first parameter representing an RV. In yet another embodiment, the one or more input variables representing one or more MV are identified for the selected ANN based on the first parameter representing a CV. In an embodiment, an amount of adjustment for each of the identified one or more input variables to bring the corresponding first parameter back to the target is calculated using the ANN, as described above. At operation 906 one or more second parameters associated with the electronic device manufacturing process are adjusted using the input variables to bring the first parameter back to the target. The one or more second parameters comprise one or more MVs, one or more CVs, or both, as described above. In one embodiment, one or more second parameters are adjusted by the amount calculated for each of the identified one or more input variables using the ANN, as described above. After adjusting the one or more second parameters, method 901 returns back to operation 901. In one embodiment, operations 901, 902, 903, 904, 905 and 906 are continuously repeated until the electronic device manufacturing process associated with the first parameter ends.

FIG. 8 shows a block diagram of an intelligent processing system using an ANN according to one embodiment. A system 800 comprises a processing chamber 801 coupled to a controller 808. Processing chamber 801 comprises a plurality of inputs (e.g., knobs) 802, 803 and 804 and a plurality of outputs 805, 806 and 807. In one embodiment, at least one of the knobs 802, 803 and 804 are adjusted by controller 808 to set MVs according to the functions of the RVs with respect to MVs, as described above. In another embodiment, least one of the knobs 802, 803 and 804 are adjusted by controller 808 to set CVs according to the functions of the RVs with respect to CVs, as described above. Adjusting the knobs to set CVs result in changing the RVs in a predetermined range, as described above. Outputs 805, 806, 807 are used to monitor one or more RVs, one or more CVs, or both, as described above. Controller 808 comprises a processor 809 coupled to a memory 814. Memory 814 is configured to store one or more ANNs 815 generated using training and learning processes, as described above. A monitoring system 811 is coupled to processor 809 to measure one or more RVs, one or more CVs, or both, as described above. In one embodiment, monitoring system 811 comprises one or more sensors, e.g., an OEM system, or other sensors to measure one or more RVs, one or more CVs, or both. A pressure controller 812 and a temperature controller 813 are coupled to processor 809. An optional display 816 and input/output devices 817 are coupled to processor 809. Processor 809 is configured to perform the methods as described above.

The processing chamber 801 may be any type of semiconductor processing chamber known in the art, such as, but not limited to chambers manufactured by Applied Materials, Inc. located in Santa Clara, Calif., or any other processing chamber.

Figure 10:
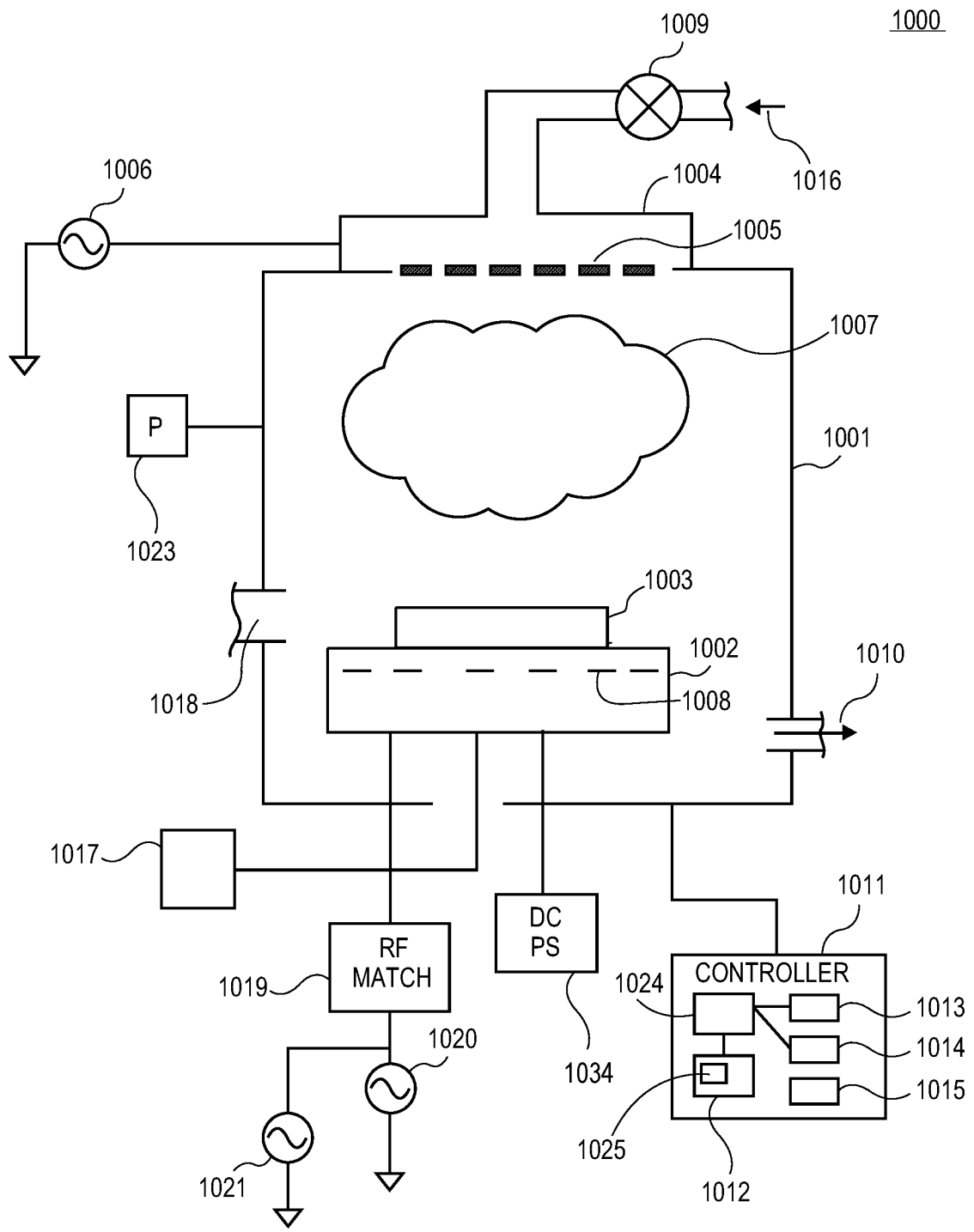
FIG. 10 shows a block diagram of an intelligent semiconductor processing system according to another embodiment of the invention.

FIG. 10 shows a block diagram of an intelligent semiconductor processing system 1000 according to another embodiment of the invention. As shown in FIG. 10, system 1000 has a processing chamber 1001. A movable pedestal 1002 to hold a workpiece 1003 is placed in processing chamber 1001. Pedestal 1002 comprises an electrostatic chuck ("ESC"), a DC electrode 1008 embedded into the ESC, and a cooling/heating base. In an embodiment, pedestal 1002 acts as a moving cathode. In an embodiment, the ESC comprises an $Al_2O_3$ material, $Y_2O_3$, or other ceramic materials known to one of ordinary skill of electronic device manufacturing. A DC power supply 1034 is connected to the DC electrode 1008 of the pedestal 1002.

As shown in FIG. 10, a workpiece 1003 is loaded through an opening 1018 and placed on pedestal 1002. Workpiece 1003 comprises a semiconductor wafer, e.g., silicon, germanium, or any other semiconductor wafer. In one embodiment, workpiece 1003 comprises any material to make any of integrated circuits, passive (e.g., capacitors, inductors) and active (e.g., transistors, photo detectors, lasers, diodes) microelectronic devices. Workpiece 1003 may include insulating materials that separate such active and passive microelectronic devices from a conducting layer or layers that are formed on top of them. In one embodiment, workpiece 1003 comprises a silicon substrate that includes one or more dielectric layers e.g., silicon dioxide, silicon nitride, sapphire, and other dielectric materials. In one embodiment, workpiece 1003 is a wafer stack comprising one or more layers. The one or more layers of the workpiece 1003 can include conducting, semiconducting, insulating, or any combination thereof layers.

System 1000 comprises an inlet to input one or more process gases 1016 through a mass flow controller 1009 to a plasma source 1004. A plasma source 1004 comprising a showerhead 1005 is coupled to the processing chamber 1001 to receive one or more gases 1016 to generate a plasma 1007. Plasma source 1004 is coupled to a RF source power 1006. Plasma 1007 is generated using a high frequency electric field. Generally, plasma 1007 comprises plasma particles, such as ions, electrons, radicals, or any combination thereof. In an embodiment, power source 1006 supplies power from about 100 W to about 3000 W at a frequency from about 2.0 MHz to about 162 MHz to generate plasma 1007.

A plasma bias power 1020 is coupled to the pedestal 1002 (e.g., a cathode) via a RF match 1019 to energize the plasma. In an embodiment, the plasma bias power 1020 provides a bias power that is not greater than 1000 W at a frequency between about 2 MHz to 60 MHz, and in a particular embodiment at about 13 MHz. A plasma bias power 1021 may also be provided, for example to provide another bias power that is not greater than 1000 W at a frequency from about 2 MHz to about 60 MHz, and in a particular embodiment, at about 13.56 MHz. Plasma bias power 1020 and bias power 1021 are connected to RF match 1019 to provide a dual frequency bias power. In an embodiment, a total bias power applied to the pedestal 1002 is from about 5 W to about 3000 W.

As shown in FIG. 10, a pressure control system 1023 provides a pressure to processing chamber 1001. As shown in FIG. 10, chamber 1001 has one or more exhaust outlets 1010 to evacuate volatile products produced during processing in the chamber. In one embodiment, plasma system 1000 is an inductively coupled plasma (ICP) system. In another embodiment, plasma system 1000 is a capacitively coupled plasma (CCP) system.

A control system 1011 is coupled to the chamber 1001. The control system 1011 comprises a processor 1024, a monitoring system 1013, a temperature controller 1014, a memory 1012 and input/output devices 1015 to provide an intelligent processing tool, as described herein. Memory 1012 is configured to store one or more ANN 1025 generated using learning and training processes to adjust one or more MVs, one or more CVs, or both, as described above. Monitoring system 1013 comprises one or more sensors, an OEM system, or both to monitor one or more RVs, one or more CVs, or both, as described above.

In one embodiment, the processor 1024 has a configuration to control monitoring one or more first parameters associated with an electronic device manufacturing process. The processor 1024 has a configuration to control determining an artificial neural network associated with the one or more first parameters. The processor 1024 has a configuration to control determining one or more second parameters using the artificial neural network. The processor 1024 has a configuration to control adjusting the one or more first parameters using the one or more second parameters.

In one embodiment, the processor 1024 has a configuration to control determining if the one or more first parameters are away from a target. The processor 1024 has a configuration to determine an artificial neural network associated with the one or more first parameters, if the one or more first parameters are away from the target.

In one embodiment, the processor 1024 has a configuration to control determining one or more target response variables as output variables. The processor 1024 has a configuration to control determining a plurality of manipulated variables as input variables based on the one or more target response variables. The processor 1024 has a configuration to control calculating a plurality of functions of the one or more target response variables with respect to the plurality of the manipulated variables to determine an artificial neural network.

The processor 1024 has a configuration to control determining one or more target response variables as output variables. The processor 1024 has a configuration to control determining a plurality of controlled variables as input variables based on the one or more target response variables. The processor 1024 has a configuration to control calculating a plurality of functions of the one or more target response variables with respect to the plurality of the controlled variables to determine an artificial neural network.

In one embodiment, the processor 1024 has a configuration to control determining one or more target controlled variables as output variables. The processor 1024 has a configuration to control determining a plurality of manipulated variables as input variables based on the one or more target controlled variables. The processor 1024 has a configuration to control calculating a plurality of functions of the one or more target controlled variables with respect to the plurality of the manipulated variables to determine an artificial neural network.

The processor 1024 has a configuration to control adjusting at least one of a MVs and CVs—e.g., pressure, a temperature, a time, bias power, source power, a gas chemistry, a gas flow, a frequency, a phase, or any combination thereof—using one or more ANNs to bring one or more process performance parameters to a target value, as described above. The control system 1011 is configured to perform methods as described herein and may be either software or hardware or a combination of both. The system 1000 may be any type of high performance semiconductor processing chamber systems known in the art, such as, but not limited to chamber systems manufactured by Applied Materials, Inc. located in Santa Clara, Calif. Other commercially available semiconductor chamber systems may be used to perform the methods as described herein.

Figure 11:
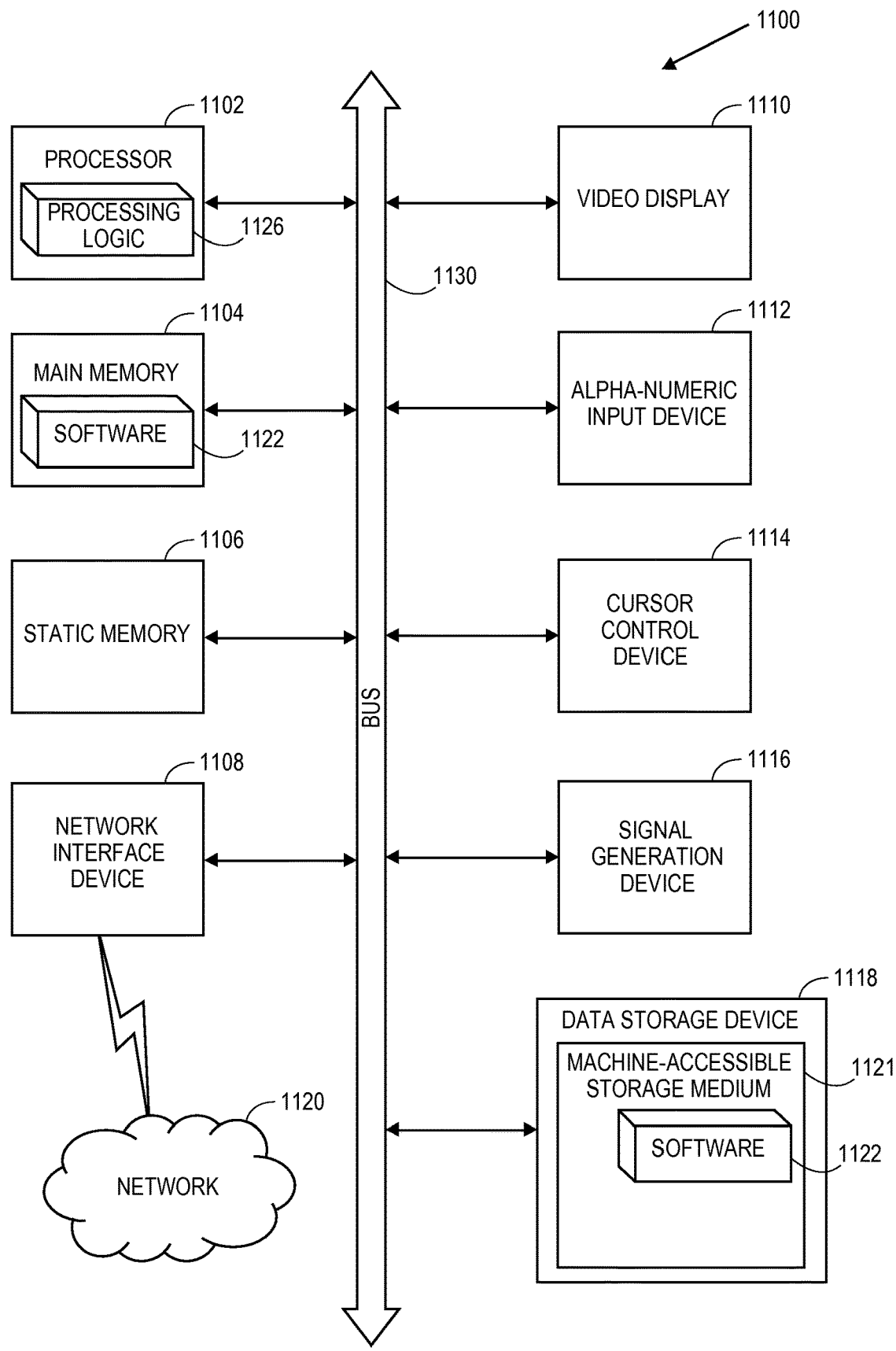
FIG. 11 shows a block diagram of a data processing system to perform methods described herein.

FIG. 11 shows a block diagram of an exemplary embodiment of a data processing system 1100 according to one embodiment of the invention. Data processing system processing 1100 represents controller 808, control system 1011 or any other data processing system to provide an intelligent processing tool, as described herein with respect to FIGS. 1-10. In alternative embodiments, the data processing system 1100 may be connected (e.g., networked) to other machines in a Local Area Network (LAN), an intranet, an extranet, or the Internet. The data processing system 1100 may operate in the capacity of a server or a client machine in a client-server network environment, or as a peer machine in a peer-to-peer (or distributed) network environment.

The data processing system 1100 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that data processing system. Further, while only a single data processing system is illustrated, the term "data processing system" shall also be taken to include any collection of data processing systems that individually or jointly execute a set (or multiple sets) of instructions to perform any one or more of the methodologies described herein.

The exemplary data processing system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a secondary memory 1118 (e.g., a data storage device), which communicate with each other via a bus 1130.

Processor 1102 represents one or more general-purpose processing devices such as a microprocessor, central processing unit, or other processing device. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to control a processing logic 1126 for performing the operations described herein with respect to FIGS. 1-10.

The computer system 1100 may further include a network interface device 1108. The computer system 1100 also may include a video display unit 1110, an alphanumeric input device 1112 (e.g., a keyboard), a cursor control device 1114 (e.g., a mouse), and a signal generation device 1116 (e.g., a speaker).

The secondary memory 1118 may include a machine-accessible storage medium (or more specifically a computer-readable storage medium) 1121 on which is stored one or more sets of instructions (e.g., software 1122) embodying any one or more of the methodologies or functions described herein. The software 1122 may also reside, completely or at least partially, within the main memory 1104 and/or within the processor 1102 during execution thereof by the data processing system 1100, the main memory 1104 and the processor 1102 also constituting machine-readable storage media. The software 1122 may further be transmitted or received over a network 1120 via the network interface device 1108.

While the machine-accessible storage medium 1121 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and and optical and magnetic media.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method to manufacture an electronic device, comprising:
   monitoring one or more first parameters associated with an electronic device manufacturing process in a deposition or etch processing tool, wherein the one or more first parameters are continuously monitored over a period of time;
   determining, using a processor, a selected artificial neural network that is configured to use the one or more first parameters as an output, wherein at least one of the first parameters is a process response variable that includes a dimension variable or parameter associated with the electronic device, wherein the selected artificial neural network is one artificial neural network of a plurality of artificial neural networks that have been previously generated and stored in a memory accessible to the processor, and wherein the selected artificial neural network is the artificial neural network that correctly maps one or more second parameters of the electronic device manufacturing process to the one or more first parameters; and
   changing one or more second parameters according to the selected artificial neural network to provide one or more modified first parameters in a predetermined range to automatically maintain a performance of the deposition or etch processing tool, the one or more second parameters selected from the group consisting of a gas composition, and an electromagnet power, wherein automatically maintaining the performance of the deposition or etch processing tool comprises maintaining a variable selected from the group consisting of an etch rate, an etch critical dimension bias, an etch selectivity, and optical emission spectroscopy data.

2. The method of claim 1, further comprising
   determining one or more target response variables as output variables;
   determining at least one of a plurality of manipulated variables and a plurality of controlled variables as input variables based on the one or more target response variables; and
   calculating a plurality of functions of the one or more target response variables with respect to the at least one of the plurality of the manipulated variables and the plurality of controlled variables, wherein the plurality of functions are stored as one of the artificial neural networks in the plurality of artificial neural networks.

3. The method of claim 1, further comprising
   determining one or more target controlled variables as one or more output variables;
   determining a plurality of manipulated variables as input variables based on the one or more target controlled variables; and
   calculating a plurality of functions of the one or more target controlled variables with respect to the plurality of the manipulated variables, wherein the plurality of functions are stored as one of the artificial neural networks in the plurality of artificial neural networks.

4. The method of claim 1, wherein at least one of the second parameters is one of a manipulated variable and a controlled variable.

5. The method of claim 1, wherein at least one of the first parameters is a controlled variable.

6. A non-transitory machine readable medium comprising instructions that cause a data processing system to perform operations comprising:
monitoring one or more first parameters associated with an electronic device manufacturing process in a deposition or etch processing tool, wherein the one or more first parameters are continuously monitored over a period of time;
determining, using a processor, a selected artificial neural network that is configured to use the one or more first parameters as an output, wherein at least one of the first parameters is a process response variable that includes a dimension variable or parameter associated with the electronic device, wherein the selected artificial neural network is one artificial neural network of a plurality of artificial neural networks that have been previously generated and stored in a memory accessible to the processor, and wherein the selected artificial neural network is the artificial neural network that correctly maps one or more second parameters of the electronic device manufacturing process to the one or more first parameters; and
changing one or more second parameters according to the selected artificial neural network to provide one or more modified first parameters in a predetermined range to automatically maintain a performance of the deposition or etch processing tool, the one or more second parameters selected from the group consisting of a gas composition, and an electromagnet power, wherein automatically maintaining the performance of the deposition or etch processing tool comprises maintaining a variable selected from the group consisting of an etch rate, an etch critical dimension bias, an etch selectivity, and optical emission spectroscopy data.

7. The non-transitory machine readable medium of claim 6, further comprising
instructions that cause the data processing system to perform operations comprising
determining one or more target response variables as output variables;
determining at least one of a plurality of manipulated variables and a plurality of controlled variables as input variables based on the one or more target response variables; and
calculating a plurality of functions of the one or more target response variables with respect to the at least one of the plurality of the manipulated variables and the plurality of controlled variables, wherein the plurality of functions are stored as one of the artificial neural networks in the plurality of artificial neural networks.

8. The non-transitory machine readable medium of claim 6, further comprising instructions that cause the data processing system to perform operations comprising
determining one or more target controlled variables as one or more output variables;
determining a plurality of manipulated variables as input variables based on the one or more controlled variables; and
calculating a plurality of functions of the one or more target controlled variables with respect to the plurality of the manipulated variables, wherein the plurality of functions are stored as one of the artificial neural networks in the plurality of artificial neural networks.

9. The non-transitory machine readable medium of claim 6, wherein at least one of the second parameters is one of a manipulated variable and a controlled variable.

10. The non-transitory machine readable medium of claim 6, wherein at least one of the first parameters is a controlled variable.

11. A system to manufacture an electronic device, comprising:
a processing chamber in a deposition or etch processing tool;
a processor coupled to the processing chamber; and
a memory coupled to the processor, the processor having a first configuration to control monitoring one or more first parameters associated with an electronic device manufacturing process, wherein the one or more first parameters are continuously monitored over a period of time, the processor having a second configuration to control determining a selected artificial neural network that is configured to use the one or more first parameters as an output, wherein at least one of the first parameters is a process response variable that includes a dimension variable or parameter associated with the electronic device, wherein the selected artificial neural network is one artificial neural network of a plurality of artificial neural networks that have been previously generated and stored in a memory accessible to the processor, and wherein the selected artificial neural network is the artificial neural network that correctly maps one or more second parameters of the electronic device manufacturing process to the one or more first parameters,
the processor having a configuration to control changing one or more second parameters according to the selected artificial neural network, to provide one or more modified first parameters in a predetermined range to automatically maintain a performance of the deposition or etch processing tool, the one or more second parameters selected from the group consisting of a gas composition, and an electromagnet power, wherein automatically maintaining the performance of the deposition or etch processing tool comprises maintaining a variable selected from the group consisting of an etch rate, an etch critical dimension bias, an etch selectivity, and optical emission spectroscopy data.

12. The system of claim 11, wherein the processor further has a fifth configuration to control determining one or more target response variables as output variables; wherein the processor has a sixth configuration to control determining at least one of a plurality of manipulated variables and a plurality of controlled variables as input variables based on the one or more target response variables; and wherein the processor has an seventh configuration to control calculating a plurality of functions of the one or more target response variables with respect to the at least one of the plurality of the manipulated variables and the plurality of controlled variables, wherein the plurality of functions are stored as one of the artificial neural networks in the plurality of artificial neural networks.

13. The system of claim 11, wherein the processor further has an eighth configuration to control determining one or more target controlled variables as output variables; wherein the processor has a ninth configuration to control determining a plurality of manipulated variables as input variables based on the one or more target controlled variables; and wherein the processor has tenth configuration to control calculating a plurality of functions of the one or more target controlled variables with respect to the plurality of the manipulated variables, wherein the plurality of functions are stored as one of the artificial neural networks in the plurality of artificial neural networks.

14. The system of claim 11, wherein at least one of the second parameters is one of a manipulated variable and a controlled variable, or wherein at least one of the first parameters is a controlled variable and at least one of the second parameters is a manipulated variable.

* * * * *